June 18, 1963  T. A. GEARY  3,094,336
MECHANICAL SEALING DEVICES
Filed Aug. 31, 1960
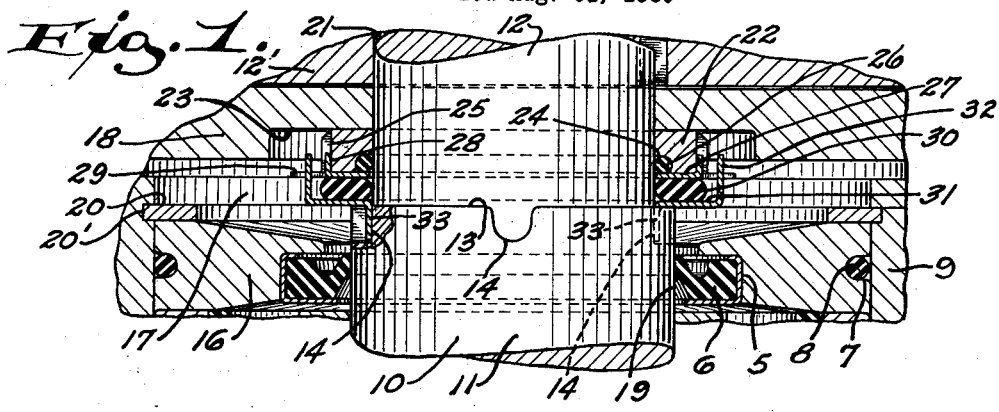
INVENTOR.
THOMAS A. GEARY
BY Morsell + Morsell
ATTORNEYS.

United States Patent Office 3,094,336
Patented June 18, 1963

---

3,094,336
MECHANICAL SEALING DEVICES
Thomas A. Geary, Kenosha, Wis., assignor to Ladish Co., Cudahy, Wis., a corporation of Wisconsin
Filed Aug. 31, 1960, Ser. No. 53,287
5 Claims. (Cl. 277—92)

This invention relates to improvements in mechanical sealing devices.

The present invention relates to a combination metal and rubber seal for rotary shafts, and is especially suited for use in liquid food handling equipment, wherein the avoidance of product loss through leakage is important, and wherein it is also essential that the entire assemblage can be easily and thoroughly cleaned.

A general object of the present invention is to provide a novel, combination metal and rubber sealing device for liquid food pumps or similar equipment, which device not only provides an effective seal between the shaft and bearing elements, but which device is so constructed that the individual members can be readily separated for cleaning.

A further object of the invention is to provide a seal which includes resilient elements which are so arranged as to be subject to a minimum of wear and therefore have a long life.

Further objects of the present invention are to provide an improved mechanical sealing device for liquid food handling equipment and the like, which device is relatively simple in construction, efficient and reliable in operation, and prevents loss of pressure and loss of the liquid product.

With the above and other objects in view, the invention consists of the improved sealing device, and all of its parts and combinations, as set forth in the claims, and all equivalents thereof.

In the accompanying drawing, wherein the same reference numerals designate the same parts in both of the views:

FIG. 1 is a fragmentary view of a pump or similar device, partly in side elevation and partly in section, showing a rotary pump shaft and a pump bearing assemblage and showing, in section, the improved sealing device as used therein; and, FIG. 2 is an exploded perspective view of the improved sealing device.

Referring now more particularly to the drawing, the numeral 10 designates a rotary shaft similar to those commonly employed in liquid food pumps and similar equipment. As will be noted, said shaft includes a first portion 12 of one diameter and a second portion 11 having a greater diameter, providing a circumferential shoulder 13 on which the sealing ring unit comprising the present invention is seated. Said shoulder 13 has spaced slots 14 therein, and as will be hereinafter described in greater detail, a first member 31 of the sealing unit is provided with downturned tangs 33 which are removably inserted into said rim slots to drivingly engage said member with the rotary shaft.

The bearing assemblage (FIG. 1) includes an annular member 16 surrounding the enlarged portion 11 of the rotary shaft, said annular member having an inner groove 5 for receiving a resilient lip-type of seal 6 and having an outer groove 7 for an O-ring 8. The bearing housing 9 is separated from a pump chamber by a wall 18, said wall having an opening through which the portion 12 of the shaft rotatably extends and said shaft portion carrying an impeller 12' in the pump chamber. The wall 18 has its inner face formed with an annular recess 23 for accommodating a portion of the improved seal assembly and there is an additional annular space 17 for accommodating said seal, there being a ring 20 seated in a groove 20' in the casing for maintaining the member 16 against axial displacement.

With reference now to the sealing ring unit, which is designed to surround the rotary shaft 10 and to provide a liquid-tight seal, it will be seen that the unit includes an outer or friction ring 22 which is positioned to abut the side of the wall 18 within the recess 23. When the machine is in operation the entire sealing ring unit rotates with the shaft 10, as will be described, and said ring 22 is in constant frictional engagement with said stationary casing wall 18. In order to withstand the wearing effect of such friction, and the heat generated thereby, the ring 22 is preferably formed of carbon. Said ring 22 is generally square in cross section and has an annular cut-out portion or groove 24 along an inner edge, and the outer periphery of said ring is provided with spaced recesses 25.

Mounted within the groove 24 of the carbon ring 22 is an O-ring 26 of rubber or similar resilient material. Said ring 26 snugly engages around the shaft 10 and is wedged within the relatively small groove 24 in the carbon ring to provide a liquid-tight seal around said shaft against loss of liquid axially along the shaft.

Positioned next to the resilient ring 26 is a flat metal back-up ring 27 which is designed to retain the O-ring 26 in position and to provide means for drivingly connecting said carbon ring to the rotating shaft as will be hereinafter described. For the latter purpose said ring 27 has circumferentially-spaced, upstanding tangs 28 intermediate its width which are designed to project into and engage within the aforementioned peripheral recesses 25 in the carbon ring 22 to positively connect said rings 22 and 27. Said metal back-up ring 27 is also provided with cutouts or openings 29 in its outer edge from which the tangs 28 are bent, the function of which will be seen.

A second resilient rubber ring 30, which is oval in cross section, is mounted adjacent the metal ring 27. Said second resilient ring snugly encircles the shaft 10 and is designed to function in cooperation with and as a supplement to the resilient O-ring 26 thereabove. As will be readily appreciated, said rubber rings 26 and 30 provide an effective seal around the shaft and minimize the possibility of leakage along the shaft from the chamber in which the impeller 12' is located.

The remaining member of the improved sealing device comprises a flat metal ring 31 which is designed to abut against the shoulder 13 of the rotary shaft and act as a driver for the other seal elements. Said ring is provided with tangs 32 which project into the cutouts 29 in the periphery of the metal ring 27 and, as mentioned, said ring 31 is also provided with tangs 33 which are removably inserted into the spaced slots 14 in said shaft shoulder 13. The ring 31 is thereby positively connected to the rotary shaft, through the engagement of said tangs 33 within the shaft slots, and the rings thereabove are positively connected to said lower ring through the upstanding tangs 32 and 28. The result is that when the shaft 10 rotates the entire ring assemblage turns with said shaft, the resilient ring 30 being under compression to constantly yieldingly urge the outer face of the friction ring against the wall 18. Thus little liquid can escape from the chamber for the impeller 12', but any that does leak between the friction ring 22 and wall 18 will be prevented from travelling farther by the seal 6.

From the foregoing detailed description, it will be seen that the present invention provides a novel rotary driven seal which combines both metal and resilient members, one of the resilient members acting both as a seal and a compressor. The individual rings are drivingly connected through a series of interfitting tangs as described, and when it is desired to clean the assemblage the rings may be easily separated and cleaning fluid circulated therebetween. This feature is particularly advantageous in liquid food handling equipment and the like wherein it is not only important that product loss through leakage be minimized, but wherein it is essential that the entire assemblage can be thoroughly sanitized.

It is obvious that various changes and modifications may be made in the details of construction and design of the above described sealing device without departing from the spirit of the invention, and all of such changes are contemplated as may come within the scope of the following claims.

What I claim is:

1. A sealing device for use around a rotary shaft which extends rotatably through a bearing opening in a wall comprising a unitary friction ring of hard wear resistant material adapted to surround said shaft and having a face adapted to frictionally engage said wall and having recesses, a driving ring adapted to surround said shaft, means projecting from said driving ring providing for detachable connection of said ring to the shaft, means between said driving ring and the recesses of the hard material of the friction ring for causing rotation of the latter when the driving ring rotates, and a unitary sealing member between said driving ring and a friction ring formed of inherently resilient material to urge said friction ring in an axial direction, said material also being a sealing material and being positioned to seal around the shaft.

2. A sealing ring for use around a rotary shaft which extends rotatably through a bearing opening in a wall wherein said shaft has a recessed shoulder spaced from said wall comprising a unitary friction ring of hard wear resistant material adapted to surround said shaft and to have a face frictionally engage said wall and having recesses, a backing ring having peripheral recesses and having tangs engaged in the recesses of the friction ring, a driving ring adapted to be positioned against said shaft shoulder and having tangs adapted to engage the recesses in said shaft shoulder and having other tangs engaging the peripheral recesses of said backing ring, and a resilient ring of sealing material between said driving ring and backing ring forming a unitary compression and sealing element and positioned to urge said friction ring axially outwardly toward said wall and of a size to also act as a seal around said shaft.

3. A sealing ring for use around a rotary shaft which extends rotatably through a bearing opening in a wall wherein said shaft has a shoulder spaced from said wall comprising a unitary friction ring of hard wear resistant material adapted to surround said shaft and to have a face fractionally engage said wall and having recesses, a backing ring having peripheral recesses and having tangs engaged in the recesses of the friction ring, said friction ring having an annular recess in its inner periphery adjacent said backing ring, a resilient O-ring retained in said recess by said backing ring adapted to seal around said shaft, a driving ring adapted to be positioned against said shaft shoulder and having means adapted to drivingly engage said shaft shoulder and having tangs engaging the peripheral recesses of said backing ring, and a unitary resilient element of sealing material between said driving ring and backing ring positioned to urge said friction ring axially outwardly toward said wall and also positioned to seal around the shaft.

4. An annular seal comprising a driving ring having shaft connection tangs projecting axially in one direction therefrom and adjacent its inner periphery and having other tangs projecting axially in the opposite direction from its outer periphery, a resilient ring seated on said driving ring and formed of material to seal around said shaft, a backing ring seated on said resilient ring and having peripheral recesses which are engaged by the tangs on the outer periphery of the driving ring, said backing ring also having tangs projecting therefrom, and a friction ring of hard wear resistant material on said backing ring having peripheral recesses in said hard material engaged by the tangs of the backing ring whereby said driving ring, backing ring and friction ring are mechanically connected for joint rotation, with said resilient ring being positioned to seal around the shaft and to urge said friction ring axially outwardly when the resilient ring is under compression.

5. An annular seal comprising a driving ring having shaft connection tangs projecting axially in one direction therefrom and adjacent its inner periphery and having other tangs projecting axially in the opposite direction from its outer periphery, a resilient ring seated on said driving ring and formed by material to seal around said shaft, a backing ring seated on said resilient ring and having peripheral recesses which are engaged by the tangs on the outer periphery of the driving ring, said backing ring also having tangs projecting therefrom, and a friction ring of hard wear resistant material on said backing ring having peripheral recesses in said hard material engaged by the tangs of the backing ring whereby said driving ring, backing ring and friction ring are mechanically connected for joint rotation, with said resilient ring being positioned to seal around the shaft and to urge said friction ring axially outwardly when the resilient ring is under compression, said friction ring having an annular recess in its inner periphery adjacent said backing ring, and a resilient O-ring retained in said recess by said backing ring and positioned to form a second seal around said shaft.

References Cited in the file of this patent

UNITED STATES PATENTS

| | | |
|---|---|---|
| 1,722,478 | Nelson | July 30, 1929 |
| 2,411,509 | Endebak | Nov. 26, 1946 |
| 2,872,220 | Payne | Feb. 3, 1959 |